(12) United States Patent
Batchelder

(10) Patent No.: US 12,269,215 B2
(45) Date of Patent: *Apr. 8, 2025

(54) PART QUALITY MONITORING IN A STEREOLITHOGRAPHIC ADDITIVE MANUFACTURING SYSTEM

(71) Applicant: Stratasys, Inc., Eden Prairie, MN (US)

(72) Inventor: J. Samuel Batchelder, Woodinville, WA (US)

(73) Assignee: STRATASYS, INC., Eden Prairie, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 18/470,680

(22) Filed: Sep. 20, 2023

(65) Prior Publication Data
US 2024/0025123 A1     Jan. 25, 2024

Related U.S. Application Data

(63) Continuation of application No. 17/543,015, filed on Dec. 6, 2021, now Pat. No. 11,794,411.
(Continued)

(51) Int. Cl.
*B29C 64/386*     (2017.01)
*B29C 64/129*     (2017.01)
(Continued)

(52) U.S. Cl.
CPC .......... *B29C 64/386* (2017.08); *B29C 64/129* (2017.08); *B33Y 10/00* (2014.12);
(Continued)

(58) Field of Classification Search
CPC ... B29C 64/386; B29C 64/393; B29C 64/129; B33Y 10/00; B33Y 50/00; B33Y 50/02;
(Continued)

(56) References Cited

U.S. PATENT DOCUMENTS 5,835,220 A * 11/1998 Kazama .................... G01J 4/04
    356/369
6,977,714 B2    12/2005 Finders
(Continued)

FOREIGN PATENT DOCUMENTS

EP     2996852 A1    3/2016
EP     2996852 A4    3/2017
(Continued)

OTHER PUBLICATIONS

Prosecution History of U.S. Appl. No. 17/543,015, filed Dec. 6, 2021 including: Notice of Allowance and Fee(s) Due mailed Jun. 26, 2023; and Non-Final Rejection mailed Feb. 10, 2023.

*Primary Examiner* — Galen H Hauth
*Assistant Examiner* — Lawrence D. Hohenbrink, Jr.
(74) *Attorney, Agent, or Firm* — Westman, Champlin & Koehler, P.A.

(57) ABSTRACT

A method for 3D printing a part in a layer-wise manner includes providing a pool of polymerizable liquid in a vessel over a build window and positioning a downward-facing build platform in the pool, thereby defining a build region above the build window. The method includes selectively curing a volume of polymerizable liquid in the build region by imparting electromagnetic radiation through the build window to form a printed layer of the part adhered to the build platform and scanning at least a portion of the build window with monochromatic, polarized light along a plane of incidence. The method includes measuring a change in intensity and polarity of the light to obtain information about the printed layer. The method includes raising the build platform to a height of a next layer to be printed and modifying the electromagnetic energy imparted into the next layer based upon the obtained information to print a next (Continued)

layer. The imparting, scanning, measuring, raising and modifying steps are repeated until the part is printed.

23 Claims, 4 Drawing Sheets

Related U.S. Application Data

(60) Provisional application No. 63/121,616, filed on Dec. 4, 2020.

(51) Int. Cl.
| | |
|---|---|
| *B33Y 10/00* | (2015.01) |
| *B33Y 50/00* | (2015.01) |
| *G01N 21/21* | (2006.01) |
| *B29C 64/393* | (2017.01) |
| *B33Y 50/02* | (2015.01) |
| *G01N 21/23* | (2006.01) |
| *G01N 21/84* | (2006.01) |

(52) U.S. Cl.
CPC ............ *B33Y 50/00* (2014.12); *G01N 21/211* (2013.01); *B29C 64/393* (2017.08); *B33Y 50/02* (2014.12); *G01N 21/23* (2013.01); *G01N 2021/8416* (2013.01); *G01N 2021/8438* (2013.01)

(58) Field of Classification Search
CPC ................ G01N 21/211; G01N 21/23; G01N 2021/8416
USPC ......................................................... 264/323
See application file for complete search history.

(56) References Cited

U.S. PATENT DOCUMENTS

| | | |
|---|---|---|
| 9,782,934 B2 | 10/2017 | Willis et al. |
| 10,150,280 B2 | 12/2018 | Aghababaie et al. |
| 10,166,725 B2 | 1/2019 | Willis et al. |
| 10,213,956 B2 | 2/2019 | Willis et al. |
| 10,245,785 B2 | 4/2019 | Adzima |
| 10,252,468 B2 | 4/2019 | Greene et al. |
| 10,354,445 B2 | 7/2019 | Greene et al. |
| 10,421,233 B2 | 9/2019 | Lin et al. |
| 10,464,259 B2 | 11/2019 | Lin et al. |
| 10,723,068 B2 | 7/2020 | Vadder |
| 10,780,641 B2 | 9/2020 | Greene et al. |
| 10,780,643 B2 | 9/2020 | Greene et al. |
| 11,151,292 B2 | 10/2021 | Laaker et al. |
| 11,351,735 B2 | 6/2022 | Greene et al. |
| 11,794,411 B2 * | 10/2023 | Batchelder ............ B29C 64/129 |
| 2014/0339741 A1 | 11/2014 | Aghababaie et al. |
| 2015/0360419 A1 | 12/2015 | Willis et al. |
| 2016/0067921 A1 | 3/2016 | Willis et al. |
| 2017/0102679 A1 | 4/2017 | Greene et al. |
| 2017/0182708 A1 | 6/2017 | Lin et al. |
| 2017/0291360 A1 | 10/2017 | Franke et al. |
| 2017/0326807 A1 | 11/2017 | Greene et al. |
| 2018/0056608 A1 | 3/2018 | Dunn et al. |
| 2018/0086003 A1 | 3/2018 | Greene et al. |
| 2018/0154443 A1 * | 6/2018 | Milshtein ................ B22F 12/41 |
| 2018/0290374 A1 | 10/2018 | Willis et al. |
| 2018/0333911 A1 | 11/2018 | Lin et al. |
| 2018/0333912 A1 | 11/2018 | Lin et al. |
| 2018/0333913 A1 | 11/2018 | Lin et al. |
| 2018/0348646 A1 | 12/2018 | Lin et al. |
| 2018/0361666 A1 | 12/2018 | Adzima |
| 2019/0134886 A1 | 5/2019 | Willis et al. |
| 2019/0176398 A1 | 6/2019 | Adzima |
| 2019/0291210 A1 * | 9/2019 | Elhadj ................. B23K 26/342 |
| 2019/0322033 A1 | 10/2019 | Willis et al. |
| 2020/0004707 A1 | 1/2020 | Pirzadeh |
| 2020/0023587 A1 | 1/2020 | Greene et al. |
| 2020/0031044 A1 | 1/2020 | Lin et al. |
| 2020/0303997 A1 | 9/2020 | Brinkmann et al. |
| 2020/0331209 A1 | 10/2020 | Ong et al. |
| 2021/0117581 A1 | 4/2021 | Laaker et al. |
| 2021/0387420 A1 * | 12/2021 | Greene ................. B29C 64/282 |
| 2021/0394449 A1 | 12/2021 | Kostenko |
| 2022/0032372 A1 | 2/2022 | Magwood et al. |
| 2022/0100915 A1 | 3/2022 | Laaker et al. |

FOREIGN PATENT DOCUMENTS

| | | |
|---|---|---|
| EP | 2996852 B1 | 5/2018 |
| GB | 2514139 A | 11/2014 |
| GB | 2559914 A | 8/2018 |
| GB | 2564956 A | 1/2019 |
| GB | 2564956 B | 4/2020 |
| WO | 2014186463 A1 | 11/2014 |
| WO | 2017062630 A1 | 4/2017 |
| WO | 2019129561 A1 | 7/2019 |
| WO | 2019139561 A1 | 7/2019 |
| WO | 2020005706 A1 | 1/2020 |
| WO | 2020006479 A1 | 1/2020 |
| WO | 2020064779 A1 | 4/2020 |
| WO | 2020139858 A1 | 7/2020 |
| WO | 2020167665 A1 | 8/2020 |

* cited by examiner

PART QUALITY MONITORING IN A STEREOLITHOGRAPHIC ADDITIVE MANUFACTURING SYSTEM

CROSS-REFERENCE TO RELATED APPLICATION

The present application is a continuation of and claims priority of U.S. application Ser. No. 17/543,015, filed Dec. 6, 2021, which is based on and claims the benefit of U.S. provisional patent application Ser. No. 63/121,616, filed Dec. 4, 2020, the contents of which are hereby incorporated by reference in their entirety.

BACKGROUND

The present disclosure relates to additive manufacturing systems for printing 3D parts utilizing vat curing of photopolymers with optical energy. In particular, the present disclosure relates to a bottom-up stereolithographic (SL) 3D printer having a sensing system configured to measure and control part quality in a layer-wise manner.

Additive manufacturing, also called 3D printing, is generally a process in which a three-dimensional (3D) object is built by adding material to form a part rather than subtracting material as in traditional machining. Using one or more additive manufacturing techniques, a three-dimensional solid object of virtually any shape can be printed from a digital model of the object by an additive manufacturing system, commonly referred to as a 3D printer. A typical additive manufacturing work flow includes slicing a three-dimensional computer model into thin cross sections defining a series of layers, translating the result into two-dimensional position data, and feeding the data to a 3D printer which manufactures a three-dimensional structure in an additive build style. Additive manufacturing entails many different approaches to the method of fabrication, including material extrusion, ink jetting, selective laser sintering, powder/binder jetting, electron-beam melting, electrophotographic imaging, and stereolithographic (SL) vat curing processes that cure photopolymers in a vat from the top down or from the bottom up.

Bottom-up stereolithographic 3D printers selectively cure a photopolymerizable liquid provided in a vat or tray on a downward-facing build platform by emitting patterns of electromagnetic radiation from a programmable light source through a build window located beneath the resin to produce solid layers. The build platform is lifted as new layers are formed. Generally, a bottom-up vat printer includes a tray filled with a pool of photopolymerizable liquid resin. The tray has an optically transparent window in the bottom, and an imaging source, e.g., a digital light processor (DLP), a liquid crystal display (LCD) or a scanning laser beam, that transmits light upwards though the window and causes the liquid to polymerize. A curing platform is placed into the pool of liquid and is utilized to raise the part being printed away from the window in a layer-wise manner. The distance between the part surface and the window or a separation membrane located above the window defines a thickness of the next layer. In some embodiments, a SL printer can utilize includes a digital light processing (DLP) projector that emits optical energy in the form of a projected image area in a wavelength or band of wavelengths and with sufficient power to cause the liquid to react and form a polymerized layer. The cured layer is then separated from the window and the curing platform raised a distance of a layer, and the process is repeated until the part is completely printed.

Various programmable light sources may be used to emit optical energy. The main varieties of light sources are: lasers, digital light processing (DLP) projectors, and LCD's. Lasers are directed by galvanometers to scan across the build window along cure paths. DLP projectors use an LED modulated by a digital micromirror device (DMD) to selectively generate and flash images of whole layers onto the bottom of the vat. LCD also flashes complete layers at the resin tank, but with the UV light coming from an array of LEDs shining through an LCD, not a projector.

Undesired errors, artifacts or failures may be introduced into the part building process. For example, incomplete or lack of curing can lead to printing errors because the lack of curing can result in the layer not being formed or partially formed. Additionally, separating the cured layer from the window can result in the tearing of portions of the layer such that a portion of the cured layer is undesirably separated from prior layers. There is an ongoing need to effectively and efficiently monitor and correct for defects in the printed layers.

SUMMARY

An aspect of the present disclosure relates to a method for 3D printing a part in a layer-wise manner. The method includes providing a pool of polymerizable liquid in a vessel over a build window and positioning a downward-facing build platform in the pool, thereby defining a build region above the build window. The method includes selectively curing a volume of polymerizable liquid in the build region by imparting electromagnetic radiation through the build window to form a printed layer of the part adhered to the build platform and scanning at least a portion of the build window with monochromatic, polarized light along a plane of incidence. The method includes measuring a change in intensity and polarity of the light to obtain information about the printed layer. The method includes raising the build platform to a height of a next layer to be printed and modifying the electromagnetic energy imparted into the next layer based upon the obtained information to print a next layer. The imparting, scanning, measuring, raising and modifying steps are repeated until the part is printed.

Another aspect of the present disclosure relates to a method for printing a 3D part. The method includes providing a pool of polymerizable liquid in a vessel having a build window and positioning a downward-facing build platform in the pool of polymerizable liquid a distance of a thickness of a layer from a top surface of the build window. The method includes imparting ultraviolet energy through the build window to photocure the liquid and form a printed layer of the part adhered to the build platform and scanning at least a portion of the build window with monochromatic, polarized infrared or visible light along a plane of incidence, wherein the light includes polarized parallel to the plane of incidence (p-polarized) and includes light oriented perpendicular to the plane of incidence (s-polarized). The method includes measuring a change in intensity and polarity of the light to obtain information about the printed layer. The build platform is raised to a height of a next layer to be printed and the ultraviolet energy is modified prior to being imparted into the next layer based upon the obtained information to print a next layer. The method includes repeating the imparting, scanning, measuring, raising and modifying steps until the part is printed.

Another aspect of the present disclosure relates to a method for 3D printing a part in a layer-wise manner. The method includes providing a pool of polymerizable liquid in a vessel having a build window and positioning a build platform in the pool of polymerizable liquid a distance of a thickness of a layer from a top surface of the build window, defining a build region. The method includes imparting ultraviolet energy into the build region through the build window to selectively solidify the polymerizable liquid in the build region and thereby form a printed layer of the part adhered to the build platform and utilizing an ellipsometric imaging system to scan at least a portion of the build window with monochromatic, polarized infrared or visible light along a plane of incidence, wherein the light includes polarized parallel to the plane of incidence (p-polarized) and includes light oriented perpendicular to the plane of incidence (s-polarized) and measure a change in intensity and polarity of the light to obtain information about the printed layer. The method includes raising the build platform a height of a next layer to be printed and modifying the ultraviolet energy imparted into the next layer based upon the obtained information to print a next layer. The method includes repeating the imparting, scanning, measuring, raising and modifying steps until the part is printed.

Definitions

Unless otherwise specified, the following terms as used herein have the meanings provided below:

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis.

The term "providing", such as for "providing a monomer", when recited in the claims, is not intended to require any particular delivery or receipt of the provided item. Rather, the term "providing" is merely used to recite items that will be referred to in subsequent elements of the claim(s), for purposes of clarity and ease of readability.

The terms "about" and "substantially" are used herein with respect to measurable values and ranges due to expected variations known to those skilled in the art (e.g., limitations and variabilities in measurements).

The term "latent image" means an invisible image produced by the exposure of a photosensitive material such as a photopolymer to electromagnetic radiation. When developed, the area that was exposed to electromagnetic radiation darkens and forms a visible image.

DETAIL DESCRIPTION

The present disclosure relates to a bottom-up stereolithographic 3D printer that utilizes ellipsometry to obtain information about a printed layer adjacent a substantially optically transparent window of a resin tank. When a layer of a part is polymerized or cured, a refractive index of the material changes to a value between that of a fully uncured material and that of a cured material, based upon the degree of polymerization. The change in refractive index can be used to produce a latent image of the just printed layer utilizing a darkfield scatter system and/or ellipsometry.

A darkfield detection system utilizes an infrared or visible light source to project and scan a beam of light onto the printed layer. The cured layer touching the window will scatter a portion of the beam which can be detected by the imaging lens and an infrared or visible light detector. The darkfield scatter detection system can identify the existence and position of build surface features oriented near parallel to the IR or visible light wave front.

While darkfield scatter detection systems are useful to determine the existence, shape and orientation of a printed layer, darkfield scatter detection systems are insensitive to determining the degree of polymerization, depth of polymerization and/or edge position features oriented substantially perpendicular to the IR or visible light wave front.

Ellipsometry is sufficiently sensitive to changes in the refractive index from a photopolymerizable liquid to a solid, cross-linked part layer to provide printing information in a layer-wise manner. The printing information is used as feedback to allow for adjustments to the printing process parameters, which results in higher-quality printed parts. The information includes providing a latent image of the printed layer from areas exposed to electromagnetic radiation, such as ultraviolet (UV) energy, the depth of polymerization from a build surface of the exposed regions, the degree of polymerization of the exposed regions and/or the spatial extend of the exposed regions.

By way of example, if the degree of polymerization is insufficient, the duration or intensity of the exposure can be increased. Also, if a portion of the layer is not present due to distortions or tearing of the cured layer during the process of being separated from the window, the intensity and duration of the UV exposure can be adjusted in the newly printed layer to compensate for the non-present portion of the prior layer. As such, the use of ellipsometry with a bottom-up stereolithographic 3D printer provides an effective means of detecting layer quality.

Figure 1:
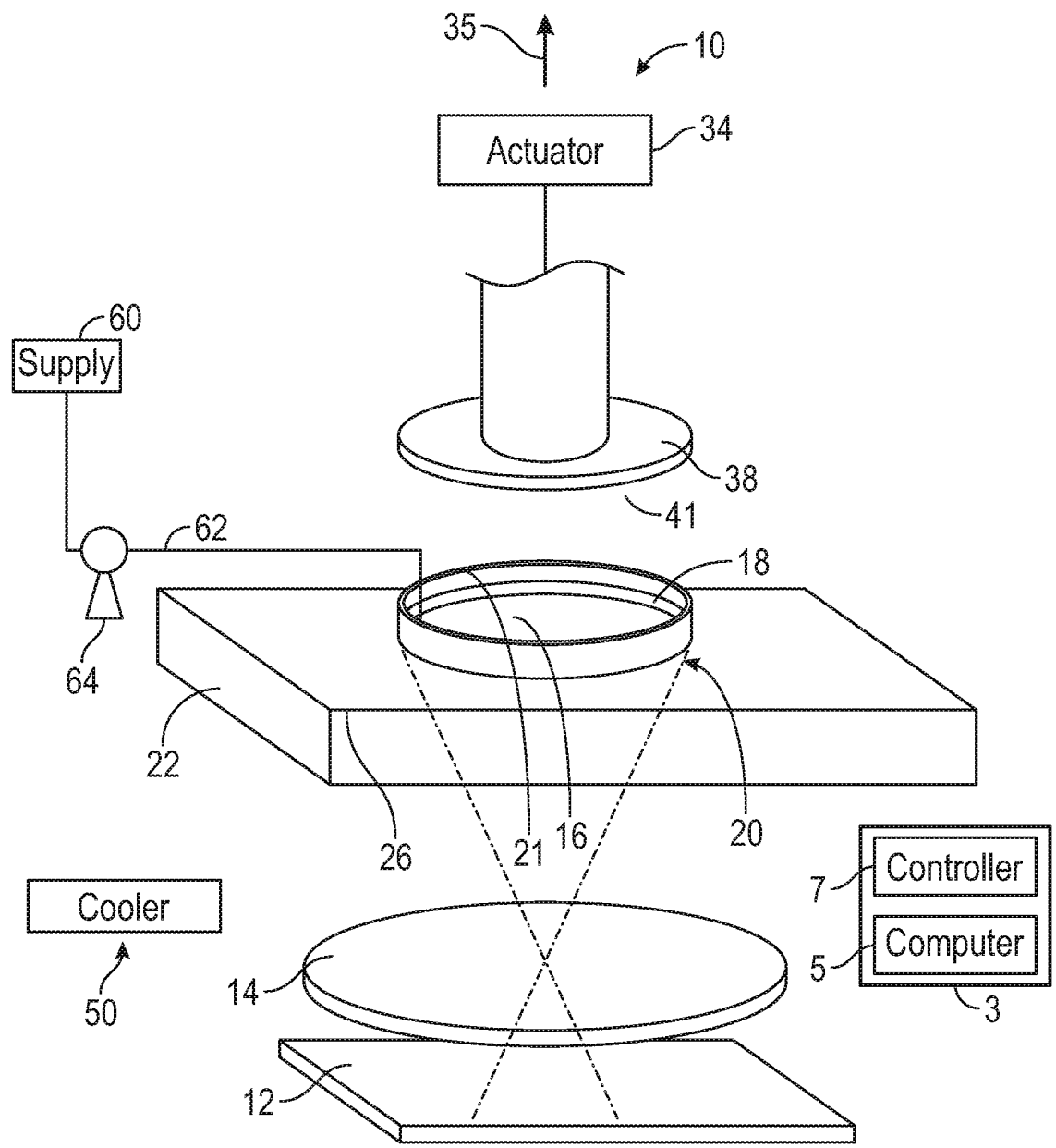
FIG. 1 is a schematic diagram of a digital light processing (DLP) 3D printer with active cooling.
Figure 2:
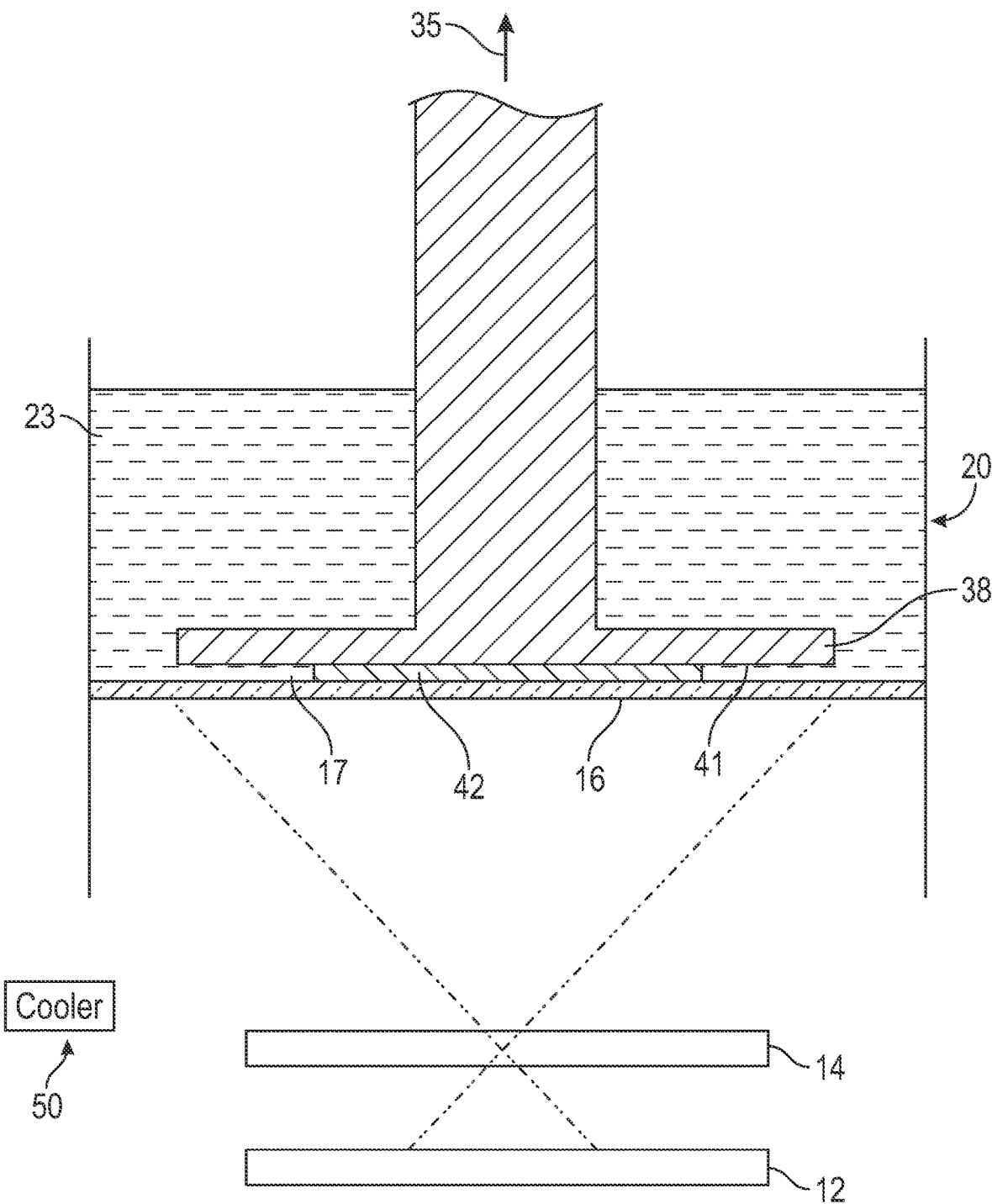
FIG. 2 is a schematic diagram of a layer being printed with the DLP 3D printer.

Referring to FIG. 1, an exemplary printer for use with the present invention is illustrated as DLP system 10. The DLP system 10 includes a digital light projector 12 which projects electromagnetic radiation, such as UV light, in a pattern based upon a geometry of a sliced layer of a 3D digital model to an imaging lens 14. An alternative to the imaging lens 14 is a minor. The imaging lens 14 directs the projected optical stimulation through a window 16, a substantially optically transparent plate, that may form a portion of a bottom wall 18 of a vessel 20. The vessel 20 has an interior cavity 21 configured to retain a pool 23 of a photocurable liquid resin reactive with the introduced electromagnetic radiation, where the vessel 20 is retained on a support member 22.

The system 10 includes an actuator 34 that moves a build platform 38 in the z direction as indicated by arrow 35. The build platform 38 is configured to adhere to polymerized material during the initial building of the part using the DLP printing process. At the beginning of the printing processes, at least a bottom surface 41 of the build platform 38 is submerged in the pool 23 of the liquid resin above the window 16. An interstitial region is created between the build platform 38 and the interior cavity 21 of the vessel 20, and resin filling this region is cured to form a layer of the part through a polymerization process initiated by imaging the electromagnetic radiation through the window 16. When the resin in the interstitial region is cured, an initial formed layer of a 3D part 42 bonds to the build platform 38 and the window 16. The formed layer is then removed from the window 16 using a separation technique (e.g., peeling) as are known in the art, and typically including moving the build platform 38 in the x, y, and/or z directions away from the window 16.

Once the layer is removed from the plate 16, the actuator 34 raises the part build platform 38 to the increment of a height of a layer, which allows nearby photocurable liquid to again fill the interstitial region between the previously printed layer and the window 16. The pattern of optical stimulation causes the curing, or polymerization reaction, of the monomer and initiator that results in a successive layer of the 3D part being formed. The layer-by-layer processing of printing, removing and raising is continued until the 3D part is fully formed.

As the build continues, the pool 23 of the photocurable material is depleted by the creation of successive layers of the 3D part 32. The SL based system 10 may include a means to refill monomer with an additional photocurable material supply 60 to the vessel 20 through a conduit 62. The supply 60 can be elevated relative to the vessel 20 such that head pressure can be utilized as the driving force to supply photocurable material to the vessel 22. Alternatively, a pump 64 can be utilized to supply the necessary pressure to replenish the photocurable material in the vessel 20.

The system 10 also includes a controller assembly 3, which may include one or more control circuits (e.g., a controller 7) and/or one or more host computers (e.g., a computer 5) configured to monitor and operate the components of the system 10. For example, one or more of the control functions performed by the controller assembly 3, such as performing move compiler functions and emitting light or electromagnetic radiation, can be implemented in hardware, software, firmware, and the like, or a combination thereof; and may include computer-based hardware, such as data storage devices, processors, memory modules, and the like, which may be external and/or internal to the system 10.

The controller assembly 3 may communicate over a communication line with the projector 12, the actuator, and various actuators, sensors, calibration devices, display devices, and/or user input devices that are described with respect to the system 10 or other systems disclosed herein. The controller assembly 3 can communicate with the various devices using electrical, optical, and/or wireless signal lines, which may be external and/or internal to system 10, allowing controller assembly 3 to communicate with various components of system 10.

Figure 3:
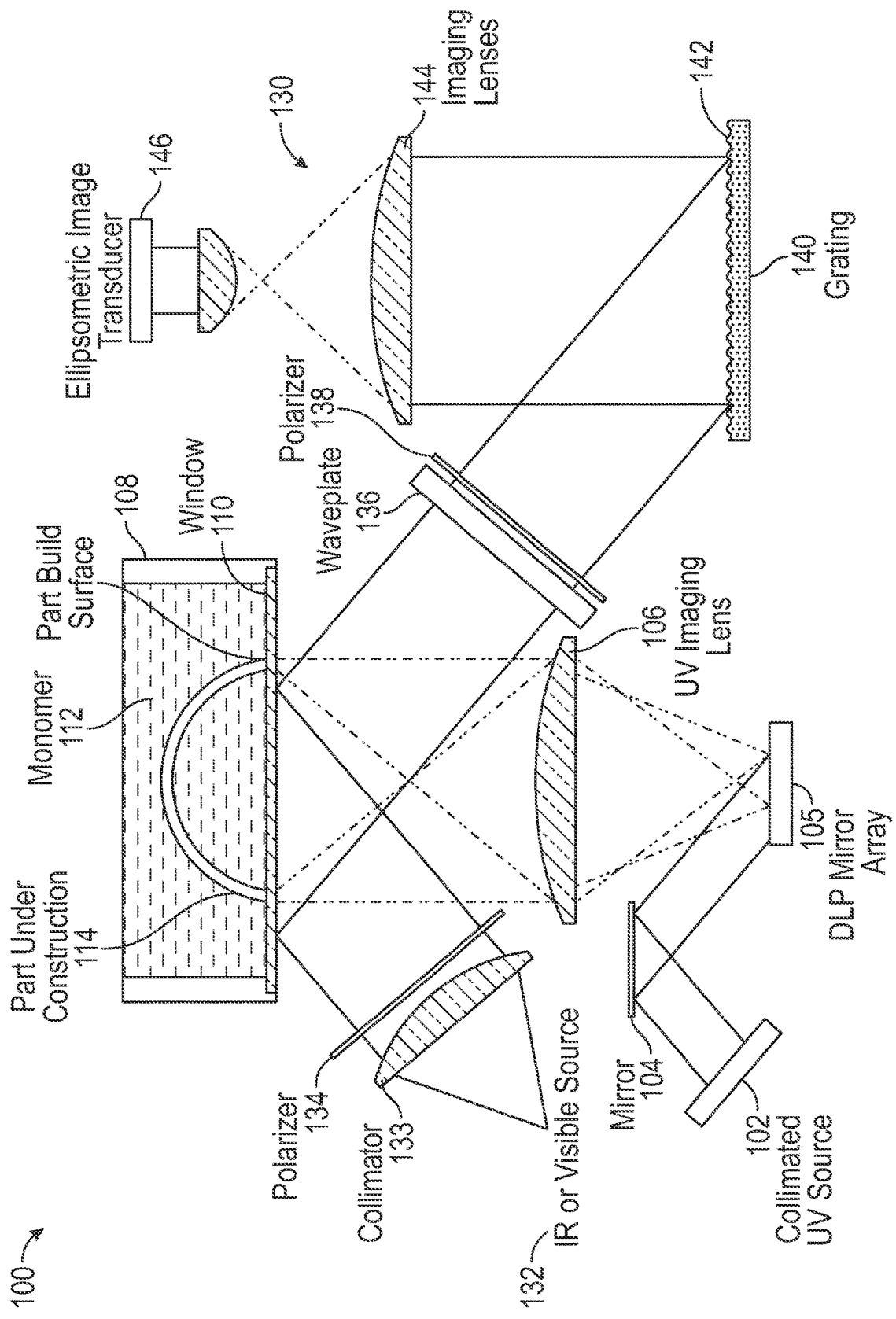
FIG. 3 is a schematic diagram of a DLP 3D printer with an ellipsometric imaging system.

Referring to FIG. 3, a schematic view of a printer of the present disclosure is illustrated at 100. The printer 100 has similar printing capabilities as discussed with respect to the DLP printer 10 and include a collimated optical energy source 102, such as a UV projector which projects rays of UV light to a minor 104, which in turn reflects the rays of UV light to a DLP mirror array 105. The DLP minor array 104 redirects the rays of UV light through an UV imaging lens 106 which projects an image of the layer to be printed.

The image of the layer to be printed is projected from the UV imaging lens 106 and through a substantially optically transparent window 110 in a tank 108 at least partially filled with monomer 112. The image of the layer causes the monomer 112 to cross-link and cure into a layer 114 adjacent a top surface 112 of the substantially optically transparent window 110.

As shown in the embodiment of FIG. 3, the printer 100 includes a latent imaging system 130, such as an ellipsometric imaging system, that is used to scan a newly printed layer 114 and provide feedback to a controller, such as the controller assembly 3 illustrated in FIG. 1. The ellipsometric imaging system 130 includes an infrared (IR) or visible light sources 132, a collimator 133 that focuses the light into beams, and a polarizer 134 which polarizes the light to an arbitrary polarization of monochromatic light. The polarized, monochromatic light can be a single spot beam or a line. The polarized, monochromatic light is directed toward and scanned across the optically transparent window 110 at an angle of incidence where the beam is different refractive index of the monomer and the cured layer are detected.

The plane defined by an incident ray on a surface and the reflected ray is called the plane of incidence. Incident monochromatic light of arbitrary polarization can be characterized as the superposition of light polarized parallel to the plane of incidence (p-polarized) plus light oriented perpendicular to the plane of incidence (s-polarized) with some phase difference. The p and s components reflect with different intensities and phase shift from the surface based upon the different refractive indices so that, in general, reflected light is elliptically polarized. The exact character of that elliptical polarization can be discovered by introducing a variable phase shift into one of the components with a phase plate, producing linearly polarized light, followed by a polarizer oriented to exactly eliminate that linear polarization. The resulting black output indicates that the ellipsometer has discovered the exact nature of the reflection, from which (for example) the index of refraction of the surface material can be extracted.

The elliptically polarized light is then reflected through a waveplate 136, a second polarizer 138 and to a mirror 140. In one embodiment, the minor 140 includes grating 142 that magnifies the light. The light is directed from the grated minor 142 to an imaging lens 144 and to an ellipsometric imaging transducer 146, which sends signal(s) to a controller assembly 3 regarding information about the printed layer. The information includes a latent image of the printed layer from areas exposed to optical energy, such as ultraviolet (UV) energy, the depth of polymerization from a build surface of the UV exposed regions, the degree of polymerization of the UV exposed regions and/or the spatial extent of the UV exposed regions.

Figure 4:
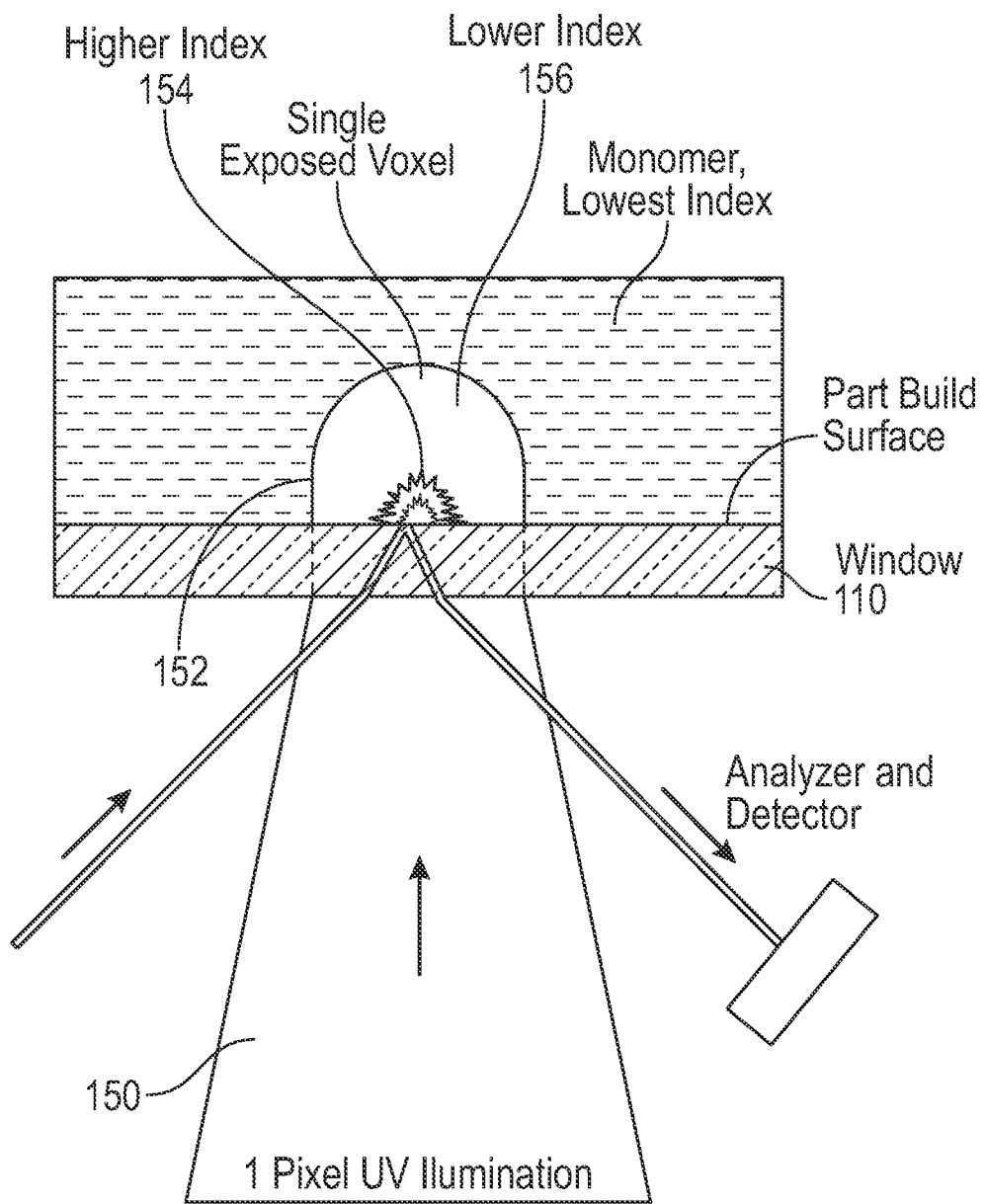
FIG. 4 is a schematic view of a spot of polymerized material analyzed using ellipsometry.

Referring to FIG. 4, an isolated DLP minor deflecting a UV spot 150 to a point on the substantially optically transparent window 110 is illustrated. As the polymerizable liquid is cured, a semi-ellipsoid of cross-linked polymer 152 forms, where there is the highest percentage of cross-linking in its center 154. The lowest percentage of cross-linking is located at large radii 156 from the center 154 of the spot, meaning the further from the center 154 of the spot, the less cross-linking of polymerizable material. A standard single point ellipsometer can detect index changes of 1:1000, which is sufficiently sensitive to detect potential temperature variations from the varied extents of curing across the semi-ellipsoid, and certainly enough to see the 10% index changes associated with polymerization of the material in a layer.

This information from the latent image, such as the depth of polymerization from a build surface of the exposed regions, the degree of polymerization of the exposed regions and/or the spatial extent of the exposed regions, is incorporated into controlling attributes of the exposure of subsequent polymerizable material as it forms an incrementally advanced build surface, such as intensity, duration and/or wavelength of the optical energy. The feedback process may be provided in a layer-by-layer manner, or a lesser layer measurement frequency, to adjust the system parameters as the part is printed and improve overall part quality and accuracy. Furthermore, other parameters such as exposure dose, average polymer length, index of refraction, monomer density, degree of cross linking, depth of layer exposure, xy pixel swell, layer shrinkage, laser power density, and initiator concentration are all possible manipulatable variables which may be accessed by using the scanning measurement information about the latent image. By way of example, the act of measuring the xy enlargement and z-depth increase of an exposed region is also related to a degree of polymerization. Measuring the geometric extent of the exposed regions accomplishes a measurement of degree of polymerization.

The use of ellipsometry can also be used to determine the buildup of stresses in a part that is being printed. As strained polymer is birefringent, a latent image measurement of the build surface provides information about which regions were building up stress (leading to eventual mechanical distortion and curl). When high stress regions are identified, the individual layers can be printed sequentially, where a first portion(s) can be subjected to electromagnetic energy to cause cross-linking and shrinking. A second portion is then cross-linked to connect the first and second regions with less internal stresses relative to a layer printed at once. In some embodiments, the layers can be segmented to brick-like pattern that break the surface up into patches. The sequential printing of the brick-like pattern minimizes internal stresses in the part being printed.

In other embodiments, latent image detection may also be used on completed parts to monitor the index of refraction. For instances, the part can be printed in a layer-wise manner with less than optimal cross-linking to limit stresses as the part is printed. Once the part is printed, the completed part can then be post processed by subjecting the part to electromagnetic energy. Monitoring the index of refraction in a post printing process allows the completed part to be polymerized to an optimal extent to improve the quality of the part.

While the ellipsometric scanning system 130 is described and illustrated with respect to a DLP 3D printer, the ellipsometric scanning system 130 and other latent image detection systems of the present disclosure can be utilized with other types of bottom-up vat polymerization systems (i.e. bottoms-up SL printers and LCD printers) to provide feedback on print quality parameters as the part is printed. Other likely embodiments of the latent imaging system include a single laser that is scanned across a linear path so that it samples test structures printed on the window, with the reflected beam being gather by a co-scanned receiver. Other embodiments include a single laser that is scanned slowly in a 2D serpentine, with the reflected beam being gather by a co-scanned receiver. Other embodiments also include a single laser shaped to form an illumination sheet perpendicular to the plane of incidence. The reflected sheet is analyzed by a line sensor (and polarizer and waveplate). Another embodiment includes utilizing the sheet sensor that is moved across a linear path, with the reflected sheet gather by a co-scanned receiver.

Although the present disclosure has been described with reference to preferred embodiments, workers skilled in the art will recognize that changes may be made in form and detail without departing from the spirit and scope of the disclosure.

The invention claimed is:

1. A system for printing a part in a layer-wise manner, the system comprising:
 a 3D printer comprising:
  a vessel configured to retain a pool of photocurable liquid, the vessel having a build window configured to pass electromagnetic radiation therethrough;
  a downward-facing build platform configured to be positioned above the build window and within the vessel, wherein the downward-facing build platform is configured to be actuated away from the build window; and
  a programmable light source configured to emit electromagnetic radiation through the build window and into the pool of photocurable liquid to form layers of the part;
 a scanning system comprising:
  a light emitting system configured to project monochromatic, polarized light through the build window along an angle of incidence; and
  an imaging system configured to measure a change in intensity and polarity of the monochromatic, polarized light reflected through the build window to obtain information about a printed layer, the imaging system configured to send a first signal related to the information obtained about the printed layer; and
 a controller configured to:
  receive the first signal from the imaging system; and
  send a second signal to the programmable light source that modifies the electromagnetic radiation imparted into a next layer based upon the signal sent from the imaging system to print the next layer of the part.

2. The system of claim 1, wherein the information obtained by the imaging system includes a latent image of the printed layer from areas exposed to the electromagnetic radiation, a depth of polymerization from a build surface of the exposed regions, a degree of polymerization of the exposed regions, a spatial extent of the exposed regions or combinations thereof.

3. The system of claim 1, wherein the electromagnetic radiation emitted from the programmable light source comprises ultraviolet radiation.

4. The system of claim 1, wherein the programmable light source comprises a digital light processing projector, a liquid crystal display, a scanning laser beam, or a combination thereof.

5. The system of claim 1, wherein the monochromatic, polarized light configured to pass through the build window comprises monochromatic, polarized visible light and/or monochromatic, polarized infrared light.

6. The system of claim 1, wherein the scanning system comprises an ellipsometric imaging system.

7. The system of claim 5, wherein the light emitting system comprises:
 a light emitting source configured to project the monochromatic, polarized infrared light or the monochromatic, polarized visible light;
 a collimator configured to focus the monochromatic, polarized infrared light and/or the monochromatic, polarized visible light into beams; and
 a first polarizer configured to polarize the focused monochromatic, polarized infrared light and/or the monochromatic, polarized visible light at the angle of incidence across at least a portion of the build window.

8. The system of claim 7, wherein the collimator is configured to focus the monochromatic, polarized infrared light and/or the monochromatic, polarized visible light into a shape of a single spot beam or a line.

9. The system of claim 7, wherein the imaging system comprises:

a waveplate configured to pass the reflected monochromatic, polarized infrared light and/or the reflected monochromatic, polarized visible light passed through the build window;

a second polarizer configured to receive the monochromatic, polarized infrared light and/or the monochromatic, polarized visible light from the waveplate and repolarize the monochromatic, polarized infrared light and/or the reflected monochromatic, polarized visible light received from the waveplate;

a mirror configured to reflect the repolarized, monochromatic infrared light and/or the repolarized, monochromatic visible light from the second polarizer;

an imaging lens configured to receive the repolarized, monochromatic infrared light and/or the repolarized, monochromatic visible light from the mirror and form a latent image; and an image transducer configured to collect the latent image from the imaging lens.

10. The system of claim 9, wherein the mirror comprises grating configured to magnify the repolarized, monochromatic infrared light and/or the repolarized, monochromatic visible light reflected from the second polarizer.

11. A system for printing a part in a layer-wise manner, the system comprising:
a 3D printer comprising:
a vessel configured to retain a pool of photocurable liquid, the vessel having a build window configured to pass electromagnetic radiation therethrough;
a downward-facing build platform configured to be positioned above the build window and within the vessel, wherein the downward-facing build platform is configured to be actuated away from the build window; and
a programmable light source configured to emit ultraviolet radiation through the build window and into the pool of photocurable liquid to form layers of the part;
an ellipsometric scanning system comprising:
a light emitting system configured to project monochromatic, polarized infrared light and/or monochromatic, polarized visible light along an angle of incidence and through the build window along the angle of incidence, wherein the monochromatic, polarized infrared light and/or the monochromatic, polarized visible light includes monochromatic, polarized infrared light and/or monochromatic, polarized visible light polarized parallel to the angle of incidence (p-polarized) and includes monochromatic, polarized infrared light and/or monochromatic, polarized visible light oriented perpendicular to the angle of incidence (s-polarized); and
an imaging system configured to measure a change in intensity and polarity of the monochromatic, polarized infrared light and/or monochromatic, polarized visible light to obtain information about a layer formed proximate the build window, the imaging system configured to send a first signal related to the information obtained about the printed layer; and
a controller configured to:
receive the first signal from the imaging system; and
send a second signal to the programmable light source that modifies the electromagnetic radiation imparted into a next layer based upon the signal from the imaging system to print the next layer.

12. The system of claim 11, wherein the information obtained by the imaging system comprises a latent image of the printed layer from areas exposed to optical energy, a depth of polymerization from a build surface of the exposed regions, a degree of polymerization of the exposed regions, a spatial extent of the exposed regions or combinations thereof.

13. The system of claim 11, wherein the programmable light source comprises a digital light processing projector, a liquid crystal display, a scanning laser beam, or a combination thereof.

14. The system of claim 11, wherein the light emitting system comprises:
a light emitting source configured to project the monochromatic, polarized infrared light or the monochromatic, polarized visible light;
a collimator configured to focus the monochromatic, polarized infrared light and/or the monochromatic, polarized visible light into beams; and
a first polarizer configured to polarize the focused monochromatic, polarized infrared light and/or the monochromatic, polarized visible light at the angle of incidence across at least a portion of the build window.

15. The system of claim 14, wherein the collimator is configured to focus the monochromatic, polarized infrared light and/or the monochromatic, polarized visible light into a shape of a single spot beam or a line.

16. The system of claim 14, wherein the imaging system comprises:
a waveplate configured to pass the reflected monochromatic, polarized infrared light and/or the reflected monochromatic, polarized visible light from passed through the build window;
a second polarizer configured to receive the monochromatic, polarized infrared light and/or the monochromatic, polarized visible light from the waveplate and repolarize the monochromatic, polarized infrared light and/or the reflected monochromatic, polarized visible light received from the waveplate;
a mirror configured to reflect the repolarized, monochromatic infrared light and/or the repolarized, monochromatic visible light from the second polarizer;
an imaging lens configured to receive the repolarized, monochromatic infrared light and/or the repolarized, monochromatic visible light from the mirror and form a latent image; and
an ellipsometric image transducer configured to collect the latent image from the imaging lens.

17. The system of claim 16, wherein the mirror comprises grating configured to magnify the repolarized, monochromatic infrared light and/or the repolarized, monochromatic visible light reflected from the second polarizer.

18. An ellipsometric scanning system configured for use with a bottom-up stereolithographic 3D printer comprising a vessel with a build window and a controller, the ellipsometric scanning system comprising:
a light emitting system configured to project monochromatic, polarized infrared light and/or monochromatic, polarized visible light along an angle of incidence and through the build window along the angle of incidence, wherein the monochromatic, polarized infrared light and/or the monochromatic, polarized visible light includes monochromatic, polarized infrared light and/or monochromatic, polarized visible light polarized parallel to the angle of incidence (p-polarized) and includes monochromatic, polarized infrared light and/or monochromatic, polarized visible light oriented perpendicular to the angle of incidence (s-polarized); and an imaging system configured to measure a change in intensity and polarity of the monochromatic, polarized infrared light and/or monochromatic, polarized visible light to obtain information about a printed layer, the imaging system configured to send a signal related to the information obtained about the printed layer.

19. The ellipsometric scanning system of claim 18, wherein the information obtained by the imaging system comprises a latent image of the printed layer from areas exposed to optical energy, a depth of polymerization from a build surface of the exposed regions, a degree of polymerization of the exposed regions, a spatial extent of the exposed regions or combinations thereof.

20. The ellipsometric scanning system of claim 18, wherein the light emitting system comprises:
  a light emitting source configured to project the monochromatic, polarized infrared light or the monochromatic, polarized visible light;
  a collimator configured to focus the monochromatic, polarized infrared light and/or the monochromatic, polarized visible light into beams; and
  a first polarizer configured to polarize the focused monochromatic, polarized infrared light and/or the monochromatic, polarized visible light at the angle of incidence across at least a portion of the build window.

21. The ellipsometric scanning system of claim 20, wherein the collimator is configured to focus the monochromatic, polarized infrared light and/or the monochromatic, polarized visible light into a shape of a single spot beam or a line.

22. The ellipsometric scanning system of claim 20, wherein the imaging system comprises:
  a waveplate configured to pass the reflected monochromatic, polarized infrared light and/or the reflected monochromatic, polarized visible light passed through the build window;
  a second polarizer configured to receive the monochromatic, polarized infrared light and/or the monochromatic, polarized visible light from the waveplate and repolarize the monochromatic, polarized infrared light and/or the reflected monochromatic, polarized visible light received from the waveplate;
  a mirror configured to reflect the repolarized, monochromatic infrared light and/or the repolarized, monochromatic visible light from the second polarizer;
  an imaging lens configured to receive the repolarized, monochromatic infrared light and/or the repolarized, monochromatic visible light from the mirror and form a latent image; and
  an ellipsometric image transducer configured to collect the latent image from the imaging lens.

23. The ellipsometric scanning system of claim 22, wherein the mirror comprises grating configured to magnify the repolarized, monochromatic infrared light and/or the repolarized, monochromatic visible light reflected from the second polarizer.

* * * * *